United States Patent
Jain et al.

(10) Patent No.: US 12,231,411 B2
(45) Date of Patent: Feb. 18, 2025

(54) SCALING GATEWAY TO GATEWAY TRAFFIC USING FLOW HASH

(71) Applicant: Nicira, Inc., Palo Alto, CA (US)

(72) Inventors: Jayant Jain, Cupertino, CA (US); Ly Loi, Los Altos, CA (US); Anirban Sengupta, Saratoga, CA (US); Yong Wang, San Jose, CA (US); Mike Parsa, Santa Cruz, CA (US)

(73) Assignee: Nicira, Inc., Palo Alto, CA (US)

( * ) Notice: Subject to any disclaimer, the term of this patent is extended or adjusted under 35 U.S.C. 154(b) by 0 days.

(21) Appl. No.: 18/224,558

(22) Filed: Jul. 20, 2023

(65) Prior Publication Data
US 2023/0362140 A1 Nov. 9, 2023

Related U.S. Application Data

(60) Continuation of application No. 17/402,566, filed on Aug. 15, 2021, now Pat. No. 11,729,153, which is a
(Continued)

(51) Int. Cl.
*H04L 9/40* (2022.01)
*H04L 9/06* (2006.01)
(Continued)

(52) U.S. Cl.
CPC ........ *H04L 63/0428* (2013.01); *H04L 9/0643* (2013.01); *H04L 9/088* (2013.01);
(Continued)

(58) Field of Classification Search
CPC ............ H04L 63/0428; H04L 63/0485; H04L 63/205; H04L 9/0643; H04L 9/3215;
(Continued)

(56) References Cited

U.S. PATENT DOCUMENTS 6,330,562 B1   12/2001   Boden et al.
6,968,441 B1   11/2005   Schnee
(Continued)

FOREIGN PATENT DOCUMENTS

CA   2870048 A1   11/2013
CN   102801695 A   11/2012
(Continued)

OTHER PUBLICATIONS

S. Kent, RFC 4303—IP Encapsulating Security Payload (ESP), Dec. 2005 (Year: 2005).*
(Continued)

*Primary Examiner* — Sangseok Park
(74) *Attorney, Agent, or Firm* — Quarles & Brady LLP

(57) ABSTRACT

For a network including multiple computers acting as tunnel endpoints in a network, some embodiments provide a method for processing data messages in parallel using multiple processors (e.g., cores) of each computer. Each computer in some embodiments has a set of interfaces configured as tunnel endpoints connecting to multiple tunnels. In some embodiments, the multiple processors encrypt data messages according to a set of encryption parameters or multiple sets of encryption parameters that specify an encryption policy for data messages requiring encryption, an encryption algorithm, an encryption key, a destination network address, and an encryption-parameter-set identifier.

16 Claims, 12 Drawing Sheets

Related U.S. Application Data division of application No. 15/831,162, filed on Dec. 4, 2017, now Pat. No. 11,095,617.

(51) Int. Cl.
| | |
|---|---|
| H04L 9/08 | (2006.01) |
| H04L 9/32 | (2006.01) |
| H04L 12/66 | (2006.01) |
| H04L 45/745 | (2022.01) |
| H04L 47/20 | (2022.01) |
| H04L 61/2592 | (2022.01) |
| H04L 61/5007 | (2022.01) |
| H04L 61/5038 | (2022.01) |

(52) U.S. Cl.
CPC .......... *H04L 9/3215* (2013.01); *H04L 9/3236* (2013.01); *H04L 12/66* (2013.01); *H04L 45/745* (2013.01); *H04L 47/20* (2013.01); *H04L 61/2592* (2013.01); *H04L 61/5007* (2022.05); *H04L 61/5038* (2022.05); *H04L 2209/125* (2013.01)

(58) Field of Classification Search
CPC ... H04L 9/3236; H04L 12/66; H04L 61/2592; H04L 2209/125
See application file for complete search history.

(56) References Cited

U.S. PATENT DOCUMENTS

| | | |
|---|---|---|
| 7,003,118 B1 | 2/2006 | Yang et al. |
| 7,243,225 B2 | 7/2007 | Poeluev et al. |
| 7,284,111 B1 | 10/2007 | Sae-Koe |
| 7,373,660 B1 | 5/2008 | Guichard et al. |
| 7,383,353 B2 | 6/2008 | Valdevit et al. |
| 7,555,544 B1 | 6/2009 | Rattner et al. |
| 7,742,479 B1 * | 6/2010 | Kotha ................ H04L 61/2592 370/392 |
| 7,814,310 B2 | 10/2010 | Bouchard et al. |
| 7,962,358 B1 | 6/2011 | Fernandez et al. |
| 8,566,452 B1 | 10/2013 | Goodwin, III et al. |
| 9,483,286 B2 | 11/2016 | Basavaiah et al. |
| 9,535,750 B1 | 1/2017 | Wilkes et al. |
| 9,588,813 B1 | 3/2017 | Dubey et al. |
| 9,755,972 B1 | 9/2017 | Mao et al. |
| 9,813,379 B1 | 11/2017 | Shevade et al. |
| 9,929,970 B1 | 3/2018 | Matthews et al. |
| 10,020,984 B1 | 7/2018 | Jork et al. |
| 10,257,167 B1 | 4/2019 | Matthews et al. |
| 10,491,466 B1 | 11/2019 | Hira et al. |
| 10,498,529 B1 | 12/2019 | Hashmi et al. |
| 10,498,708 B2 | 12/2019 | Wang et al. |
| 10,601,779 B1 | 3/2020 | Matthews et al. |
| 10,623,372 B2 | 4/2020 | Wang et al. |
| 10,701,107 B2 | 6/2020 | Gopal et al. |
| 11,075,888 B2 | 7/2021 | Jain et al. |
| 11,095,617 B2 | 8/2021 | Jain et al. |
| 11,347,561 B1 | 5/2022 | Kumar et al. |
| 2002/0010866 A1 | 1/2002 | McCullough et al. |
| 2002/0097724 A1 | 7/2002 | Halme et al. |
| 2003/0088787 A1 | 5/2003 | Egevang |
| 2004/0143734 A1 | 7/2004 | Buer et al. |
| 2005/0165953 A1 | 7/2005 | Oba et al. |
| 2005/0198531 A1 | 9/2005 | Kaniz et al. |
| 2005/0213603 A1 | 9/2005 | Karighattam et al. |
| 2006/0002388 A1 | 1/2006 | Grebus et al. |
| 2006/0029278 A1 | 2/2006 | Alasia et al. |
| 2006/0227807 A1 | 10/2006 | Jakubik et al. |
| 2008/0123593 A1 | 5/2008 | Fujita et al. |
| 2008/0144625 A1 | 6/2008 | Wu et al. |
| 2008/0165964 A1 | 7/2008 | Lewis et al. |
| 2008/0307024 A1 | 12/2008 | Michaels et al. |
| 2009/0122990 A1 | 5/2009 | Gundavelli et al. |
| 2009/0231999 A1 | 9/2009 | Verma et al. |
| 2010/0138560 A1 | 6/2010 | Kivinen et al. |
| 2010/0191958 A1 | 7/2010 | Chen |
| 2010/0217949 A1 | 8/2010 | Schopp et al. |
| 2011/0035740 A1 | 2/2011 | Powell et al. |
| 2011/0113236 A1 | 5/2011 | Chenard et al. |
| 2012/0027002 A1 | 2/2012 | Jones et al. |
| 2012/0027314 A1 | 2/2012 | Lee et al. |
| 2012/0102278 A1 | 4/2012 | Joffray et al. |
| 2012/0124591 A1 | 5/2012 | Cadambi et al. |
| 2012/0170459 A1 | 7/2012 | Olesinski et al. |
| 2012/0303949 A1 | 11/2012 | Liu et al. |
| 2014/0089480 A1 | 3/2014 | Zhu |
| 2014/0108665 A1 | 4/2014 | Arora et al. |
| 2014/0313932 A1 | 10/2014 | Saltsidis |
| 2015/0052525 A1 | 2/2015 | Raghu |
| 2015/0195138 A1 | 7/2015 | Horman |
| 2015/0363240 A1 | 12/2015 | Koizumi |
| 2015/0381569 A1 * | 12/2015 | Visser ................ H04L 63/0272 726/15 |
| 2016/0057108 A1 | 2/2016 | Hu |
| 2016/0088072 A1 | 3/2016 | Likhtarov et al. |
| 2016/0135074 A1 | 5/2016 | Welin et al. |
| 2016/0182509 A1 | 6/2016 | Kantecki et al. |
| 2016/0212098 A1 | 7/2016 | Roch |
| 2016/0226815 A1 | 8/2016 | Wan et al. |
| 2016/0277478 A1 | 9/2016 | Narasimhamurthy |
| 2016/0352628 A1 | 12/2016 | Reddy et al. |
| 2017/0024293 A1 | 1/2017 | Bell et al. |
| 2017/0054603 A1 | 2/2017 | Kulkarni et al. |
| 2017/0063787 A1 | 3/2017 | Kwok et al. |
| 2017/0063979 A1 | 3/2017 | Saeki |
| 2017/0331724 A1 | 11/2017 | Carney |
| 2017/0374025 A1 * | 12/2017 | Pan ..................... H04L 63/164 |
| 2018/0054458 A1 | 2/2018 | Marck et al. |
| 2018/0062875 A1 | 3/2018 | Tumuluru |
| 2018/0067786 A1 | 3/2018 | Trung et al. |
| 2018/0131521 A1 | 5/2018 | Yang et al. |
| 2018/0176124 A1 | 6/2018 | Kancherla et al. |
| 2018/0241655 A1 | 8/2018 | Tsirkin |
| 2019/0114206 A1 | 4/2019 | Murugesan et al. |
| 2019/0141019 A1 * | 5/2019 | Kariyanahalli ......... H04L 63/20 |
| 2019/0173850 A1 | 6/2019 | Jain et al. |
| 2019/0173851 A1 | 6/2019 | Jain et al. |
| 2019/0190892 A1 | 6/2019 | Menachem et al. |
| 2019/0266217 A1 | 8/2019 | Arakawa et al. |
| 2019/0306086 A1 | 10/2019 | Boutros et al. |
| 2019/0372936 A1 | 12/2019 | Sullenberger et al. |
| 2020/0059457 A1 | 2/2020 | Raza et al. |
| 2020/0099670 A1 | 3/2020 | Kessler et al. |
| 2020/0186507 A1 | 6/2020 | Dhanabalan et al. |
| 2020/0351254 A1 | 11/2020 | Xiong et al. |
| 2020/0403922 A1 | 12/2020 | Yu et al. |
| 2021/0021523 A1 | 1/2021 | Wang et al. |
| 2021/0136049 A1 | 5/2021 | Wang et al. |
| 2021/0185025 A1 | 6/2021 | Wang et al. |
| 2021/0377232 A1 | 12/2021 | Jain et al. |
| 2021/0385203 A1 | 12/2021 | Wang et al. |
| 2021/0392121 A1 | 12/2021 | Thangapandi et al. |
| 2021/0400029 A1 | 12/2021 | Wang et al. |
| 2022/0191139 A1 | 6/2022 | Dutta |
| 2022/0191145 A1 | 6/2022 | Duraj et al. |
| 2022/0291970 A1 | 9/2022 | Kumar et al. |
| 2022/0393967 A1 | 12/2022 | Solanki et al. |
| 2022/0393981 A1 | 12/2022 | Solanki et al. |
| 2022/0394014 A1 | 12/2022 | Wang et al. |
| 2022/0394016 A1 | 12/2022 | Solanki et al. |
| 2022/0394017 A1 | 12/2022 | Solanki et al. |
| 2023/0118718 A1 | 4/2023 | Solanki et al. |
| 2023/0231826 A1 | 7/2023 | Pawar |

FOREIGN PATENT DOCUMENTS

| | | |
|---|---|---|
| CN | 110677426 A | 1/2020 |
| KR | 20030013496 A | 2/2003 |
| WO | 2016020727 A1 | 2/2016 |

(56) References Cited

FOREIGN PATENT DOCUMENTS

WO        2016049609 A1    3/2016
WO        2022260711 A1    12/2022

OTHER PUBLICATIONS

Barker, Elaine, et al., "Guide to IPsec VPNs," NIST SP 800-77 Rev. 1, Jun. 30, 2020, 166 pages, retrieved from https://csrc.nist.gov/publications/detail/sp/800-77/rev-1/final.

Kim, Joongi, et al., "NBA (Network Balancing Act): A High-performance Packet Processing Framework for Heterogeneous Processors," EuroSys '15, Apr. 21-24, 2015, 14 pages, ACM, Bordeaux, France.

Muramatsu, Shin, et al., "VSE: Virtual Switch Extension for Adaptive CPU Core Assignment in softirq," 2014 IEEE 6th International Conference on Cloud Computing Technology and Science, Dec. 15-18, 2014, 6 pages, IEEE, Singapore.

Son, Jeongseok, et al., "Protego: Cloud-Scale Multitenant IPsec Gateway," Proceedings of the 2017 USENIX Annual Technical Conference (USENIX ATC '17), Jul. 12-14, 2017, 15 pages, USENIX Association, Santa Clara, CA.

\* cited by examiner

SCALING GATEWAY TO GATEWAY TRAFFIC USING FLOW HASH

CLAIM OF BENEFIT TO PRIOR APPLICATIONS

This application is a continuation application of U.S. patent application Ser. No. 17/402,566, filed Aug. 15, 2021, now published as U.S. Patent Publication 2021/0377232. U.S. patent application Ser. No. 17/402,566 is a divisional application of U.S. patent application Ser. No. 15/831,162, filed Dec. 4, 2017, now issued as U.S. Pat. No. 11,095,617. U.S. patent application Ser. No. 15/831,162, now issued as U.S. Pat. No. 11,095,617, and U.S. patent application Ser. No. 17/402,566 now published as U.S. Patent Publication 2021/0377232 are incorporated herein by reference.

BACKGROUND

Internet protocol security (IPSec) protocol is a widely used protocol for encrypting traffic between computing devices (e.g., gateway devices at the edge of distinct networks). When using IPSec, or any other similar encryption-based tunneling protocol, a data message is encrypted and an encryption identifier and destination IP address are appended. In systems using multiple processors to process data messages using an encryption-based tunneling protocol, conflicts often arise on the transmit side when multiple processors are using a same encryption identifier over a same tunnel. Additionally, on the receive side, because the unencrypted portion of the tunneled data message contains the same destination IP address and encryption identifier, spreading the traffic among multiple processors in a consistent manner is difficult.

BRIEF SUMMARY

For a network including multiple computers acting as tunnel endpoints in a network, some embodiments provide a method for processing data messages in parallel using multiple processors (or cores) of each computer. In some embodiments, the processors (or cores) are virtual processors (or cores) executing in a virtualization layer (e.g., a hypervisor), and are associated with virtual queues of a virtual network interface controller (vNIC). Each computer in some embodiments has a set of interfaces configured as tunnel endpoints connecting to multiple tunnels. At each computer, the method assigns a set of interfaces to each processor for the processor to use to forward data messages. Each interface of the computer in some embodiments is a tunnel endpoint for multiple tunnels to a same destination computer.

The method, in some embodiments, configures a set of encryption tunnels (e.g., internet protocol security (IPSec) protocol tunnels) that specify (1) a set of messages that require encryption (e.g., by configuring a policy defined by a set of source IP addresses and a set of destination IP addresses), (2) a transform (e.g., authentication header (AH) or encapsulating security payload (ESP)), (3) an encryption algorithm (e.g., advanced encryption standard (AES), tripleDES (3DES) cipher block chaining (CBC), etc.), and (4) encryption key identification information. Some embodiments specify different combinations of the above-mentioned characteristics as well as specify an additional marking condition for applying the encryption that is associated with a mark (or key value) included in a processed data message before the applicability of the encryption tunnel is assessed.

The method configures individual processors (or cores), in some embodiments, to associate a policy that defines messages that require encryption with a particular lookup table (e.g., a custom routing lookup table) or set of routes. In some embodiments, each processor (or core) is configured to use a local lookup table or set of routes that allows the processor to label or mark a processed data message such that the data message is sent using an interface associated with that processor (or core).

Once the encryption tunnels and processors are configured, in some embodiments, received data messages to be transmitted by the computer using an encryption-based tunneling protocol (e.g., IPSec protocol) are distributed among a set of processors of the computer, based on attributes of the original data message (e.g., header values of the unencrypted data message). In some embodiments, the distribution is accomplished using a hash function on attributes of the original data message. In some embodiments, the attributes are header values (e.g., any combination of a source IP address, destination IP address, source port, destination port, and protocol type) that define a data message flow. Using a hash function based on attributes that define a data message flow ensures that data messages belonging to a same data message flow are processed by a same processor.

In some embodiments, data messages are determined to require encryption and are encrypted based on a policy or set of policies that define data message traffic that requires encryption. For example, a policy may include a source network address (e.g., 10.1.0.1), a destination network address (12.1.200.6), and a destination port, singly or in combination. Other policies may specify ranges of address as classless inter-domain routing notation (e.g., 10.1.0.0/24). Traffic-selection type policies specify a set of data message parameters similar to those that are defined in firewall rules/policies (e.g., source and destination network addresses and source and destination ports) and may include wildcards for certain parameters (e.g., source port or protocol). Route-based policies specify a destination network address of data messages needing encryption.

In some embodiments, a common policy or set of policies (e.g., a set of encryption tunnels specifying a same policy) is applied at each processor to determine which data messages require encryption. In embodiments using an IPSec protocol, these policies may be defined in a security association (SA) along with an encryption algorithm, an encryption key, and a destination address (e.g., an IP address of a destination tunnel endpoint). Each security association, in such embodiments, is assigned a locally-unique security parameter index (SPI) used to identify the SA, and its associated decryption key and decryption algorithm, at the destination tunnel endpoint for decrypting the encrypted data message. For encryption-based tunneling protocols (e.g., IPSec) that do not allow different identifiers to be negotiated for a same policy (e.g., a traffic-selection or route-based policy) for determining data messages requiring encryption, the method provides multiple tunnels over which a same policy is applied.

Each processor in some embodiments uses multiple sets of encryption parameters that apply the same policy to determine that a data message requires encryption, but each set of encryption parameters used to encrypt data messages is negotiated over a different tunnel. In some embodiments, data messages that are sent to a particular processor are encrypted using a particular set of encryption parameters based on a set of data message attributes. In some embodiments, the particular set of encryption parameters is selected using a hash function on attributes of the original data message. In some embodiments, the attributes are header values (e.g., a source IP address, destination IP address, source port, destination port, and protocol type) that define a data message flow. Using a hash function based on attributes that define a data message flow ensures that data messages belonging to a same data message flow are processed by a same encryption parameter set.

The method also provides a method for distributing data messages among processors of a destination computer that receives encrypted data messages from the source computer embodiments described above. The encrypted data messages are received at multiple interfaces of the destination computer that serve as tunnel endpoints for multiple tunnels. The encrypted data messages include unencrypted header values that are used to distribute encrypted data messages among processors of the destination computer. In some embodiments, the unencrypted header values include the network address of the interface and an identifier for a set of encryption parameters (e.g., an SPI for an SA). By increasing the number of interfaces and the number of tunnels between two computers, a set of encryption parameters can be defined that uses a same policy for determining that a data message requires encryption on each of the tunnels. Each set of encryption parameters will be associated with a different locally-unique identifier (e.g., SPI) that is included in the unencrypted header values. The unencrypted header values are used to distribute the data messages among the processors of the destination computer. In some embodiments, a hash of a set of unencrypted header values (e.g., the unencrypted locally-unique identifier and/or tunnel endpoint network address) can be used to distribute encrypted data messages among the processors of the destination computer. Increasing the number of tunnels and locally-unique encryption identifiers increases the probability that the data message load is spread more equally among the processors of the destination device.

Additionally, in some embodiments, specific SPIs are mapped to specific processors (or cores) to ensure more equal distribution of data messages among the processors of the receiving computer. In some embodiments, a set of SPIs that hashes to each processor (or core) is generated, and as each encryption parameter set (e.g., SA) is negotiated an SPI is chosen that hashes to a specific processor (or core). The selection in some embodiments is based on current processor (or core) loads while in other embodiments, it is selected in a round robin, random, or pseudo-random manner.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and the Drawings is needed. Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

For a network including multiple computers acting as tunnel endpoints in a network, some embodiments provide a method for processing data messages in parallel using multiple processors (or cores) of each computer. In some embodiments, the processors (or cores) are virtual processors (or cores) executing in a virtualization layer (e.g., a hypervisor), and are associated with virtual queues of a virtual network interface controller (vNIC). Each computer in some embodiments has a set of interfaces configured as tunnel endpoints connecting to multiple tunnels. At each computer, the method assigns a set of interfaces to each processor for the processor to use to forward data messages.

Each interface of the computer in some embodiments is a tunnel endpoint for multiple tunnels to a same destination computer.

Figure 1:
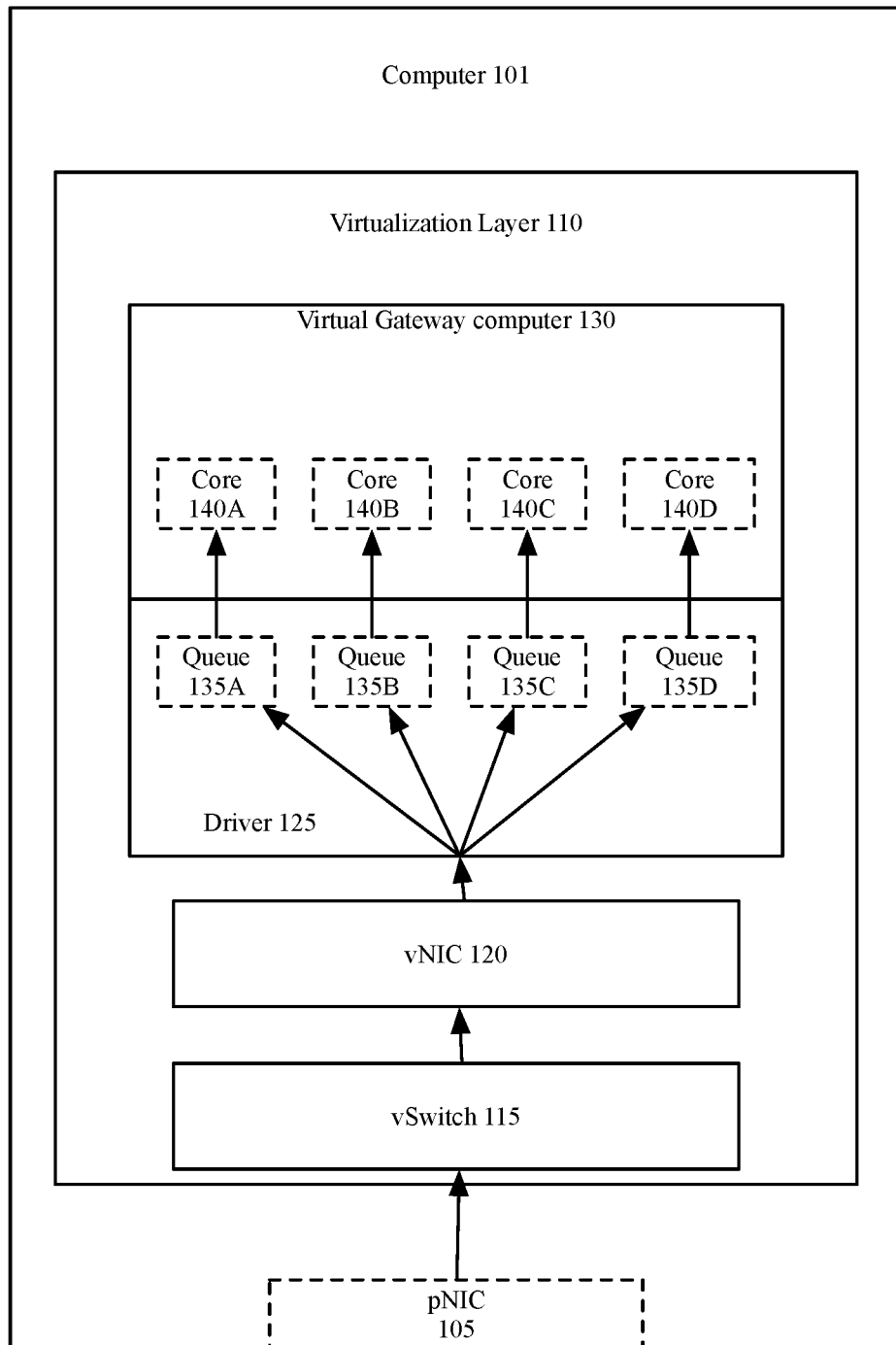
FIG. 1 conceptually illustrates a data path from a physical network interface controller (pNIC) of a gateway computer to cores of a virtual machine (VM) in some embodiments.

FIG. 1 conceptually illustrates a data path from physical network interface controller (pNIC) 105 of computer 101 to cores 140A-D of virtual gateway computer 130 (in an embodiment in which the gateway computer is a virtual machine or other data compute node) in some embodiments. FIG. 1 also depicts a virtualization layer 110 which executes a virtual switch (vSwitch 115), a virtual network interface controller (vNIC 120), driver 125, and virtual gateway computer 130. Virtualization layer 110, in some embodiments, is a hypervisor. In other embodiments, virtualization layer 110 is omitted and the virtualized entities (vSwitch 115, vNIC 120, driver 125, and virtual gateway computer 130) run on "bare metal" (e.g., without a hypervisor).

Virtual gateway computer 130 is depicted with multiple cores 140A-D and multiple queues 135A-D. In some embodiments, the multiple cores are different virtual central processing units (vCPUs) or virtual cores. Each virtual core and vCPU in some embodiments correspond to a different physical core of a physical CPU. The number of cores and queues is for exemplary purposes only, and different numbers of cores or queues may be used in some embodiments. FIG. 1 depicts that, in some embodiments, each queue is mapped to a specific core such that data messages that are queued in a particular queue are processed by a particular core.

As used in this document, the term processor or core refers to an independent processing unit that executes program instructions. Processors or cores in some embodiments are virtual processors or cores. In some embodiments, virtual processors or cores correspond to physical processors or cores such that different virtual processors or cores of a same virtualized compute node (e.g., a virtual machine) correspond to different physical processors or cores.

After data messages are received at vNIC 120, some embodiments queue the data messages in queues of vNIC 120 (not shown) based on a hash of the data message header values (e.g., a 5-tuple). After the data messages are queued in the vNIC, in some embodiments, an interrupt is raised and driver 125 determines which of cores 140A-D will handle the queued data messages. In other embodiments, data messages are queued in the vNIC without hashing, and when the interrupt is raised, driver 125 de-queues the data message from the vNIC queue and re-queues the data message in a particular queue that is associated with a particular core. In some embodiments, for data messages received using an encryption-based tunneling protocol, the re-queueing is based on an unencrypted portion of the encrypted data message (e.g., a security parameter index (SPI) used in the internet protocol security (IPSec) protocol).

As used in this document, the term tunnel refers to a connection between two tunnel endpoints (e.g., IP addresses). The term encryption tunnel, as used in this document, is used to describe a particular set of encryption parameters used to encrypt particular data messages. Thus, a tunnel, in some embodiments, comprises multiple encryption tunnels (i.e., multiple different sets of encryption parameters used to encrypt data messages transmitted (tunneled) between a particular pair of tunnel endpoints).

As used in this document, the term data packet, packet, data message, or message refers to a collection of bits in a particular format sent across a network. It should be understood that the term data packet, packet, data message, or message may be used herein to refer to various formatted collections of bits that may be sent across a network, such as Ethernet frames, IP packets, TCP segments, UDP datagrams, etc. While the examples below refer to data packets, packets, data messages, or messages, it should be understood that the invention should not be limited to any specific format or type of data message. Also, as used in this document, references to L2, L3, L4, and L7 (or layer 2, layer 3, layer 4, layer 7) are references to the second data link layer, the third network layer, the fourth transport layer, and the seventh application layer of the OSI (Open System Interconnection) layer model, respectively.

Figure 2:
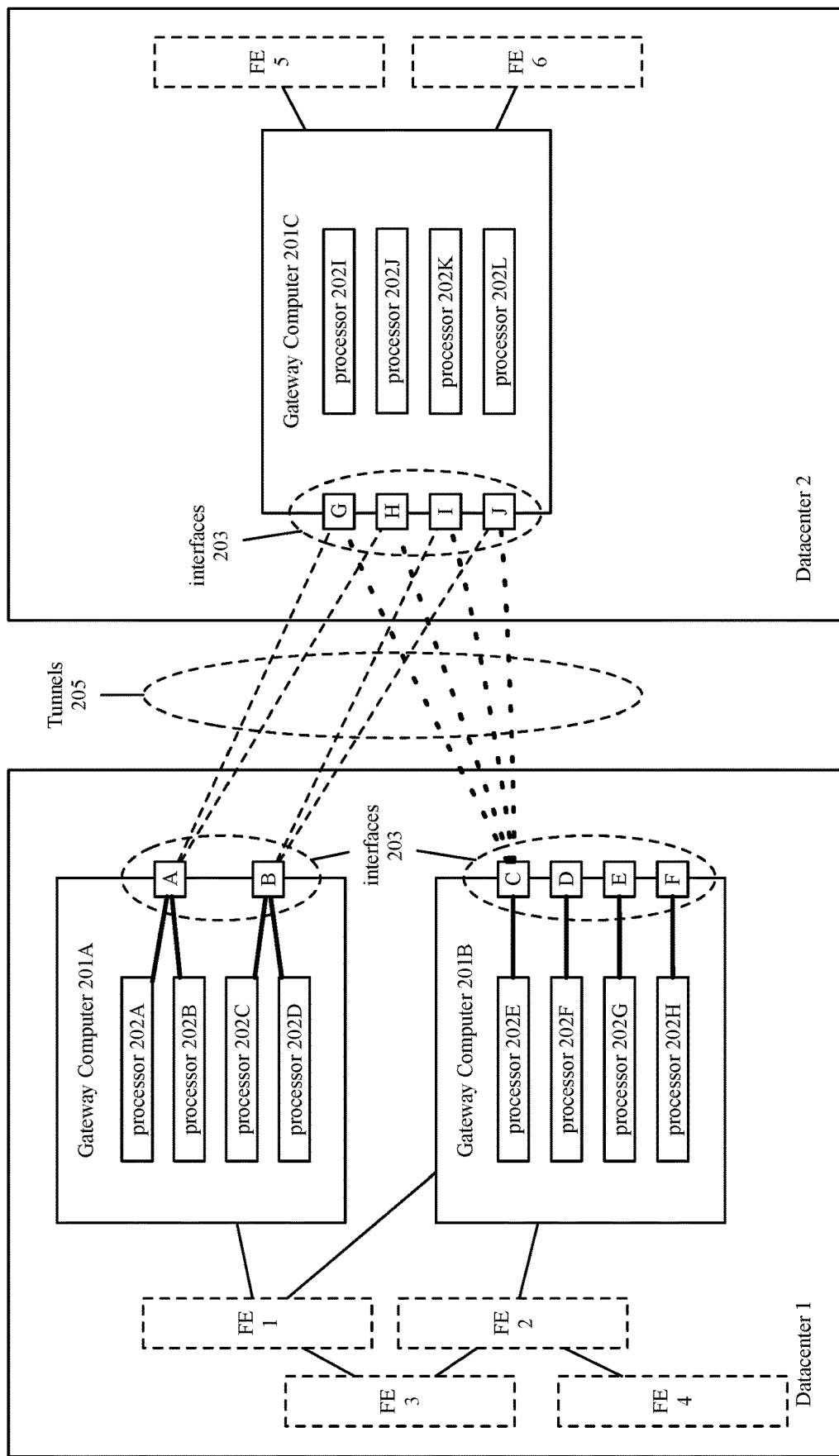
FIG. 2 conceptually illustrates a set of computers in a network configured with multiple interfaces configured with multiple tunnels.

FIG. 2 conceptually illustrates a set of gateway computers 201 operating in two datacenters. Gateway computers 201A-C communicate between datacenters using a set of tunnels 205 between interfaces 203. It is to be understood that additional computers (both gateway and non-gateway computers) within a same datacenter may also use tunnels to communicate among themselves and that not all tunnels are depicted in FIG. 2 for the sake of clarity. Other elements of the datacenter include forwarding elements (FE 1-6) such as switches, routers, bridges, etc., which may implement logical forwarding elements, and data compute nodes such as virtual machines, servers, containers, etc. (not shown), that are sources of data message traffic between the datacenters. The forwarding elements (either physical or logical), in some embodiments, define subnets (e.g., 192.168.100.0/24) which may be used to specify an encryption-based tunneling protocol policy.

Each gateway computer 201 includes multiple processors 202 and has multiple interfaces 203. Interfaces or an interface, as used in this document, refers to a network address that is capable of being used to identify a tunnel endpoint between two devices. Each processor is assigned at least one interface, over which it transmits or forwards encrypted data messages, and at least one tunnel is established for each processor. In some embodiments in which interfaces outnumber processors in a given gateway computer, at least one processor is assigned multiple interfaces over which it transmits or forwards encrypted data messages. Tunnels between gateway computers 201 may be established using a partial-mesh configuration, in which not every interface on one gateway computer establishes a tunnel with every interface of another gateway computer (e.g., as between gateway computers 201A and 201C), or in a full mesh configuration in which every interface on one gateway computer establishes a tunnel with every interface of another gateway computer (e.g., as between gateway computers 201B and 201C (only tunnels for interface C shown for clarity)). Each interface has a unique network (e.g., IP) address that is used to address the interface, and each tunnel is therefore defined by the pair of network addresses of the tunnel endpoint interfaces. In some embodiments, the interfaces include both hardware and virtual interfaces, while in other embodiments only one of hardware or virtual interfaces is used. In some embodiments, a single hardware interface (e.g., a physical network interface controller (pNIC)) is assigned multiple network addresses and comprises multiple interfaces as the term is used in this document.

Gateway computers 201A-C are physical computers in some embodiments, while in others they are virtualized gateway computers (e.g., virtual machines running in a hypervisor or on bare metal). One of ordinary skill in the art will understand that any combination of physical and virtual gateway computers may be used to implement the invention described herein.

Figure 3:
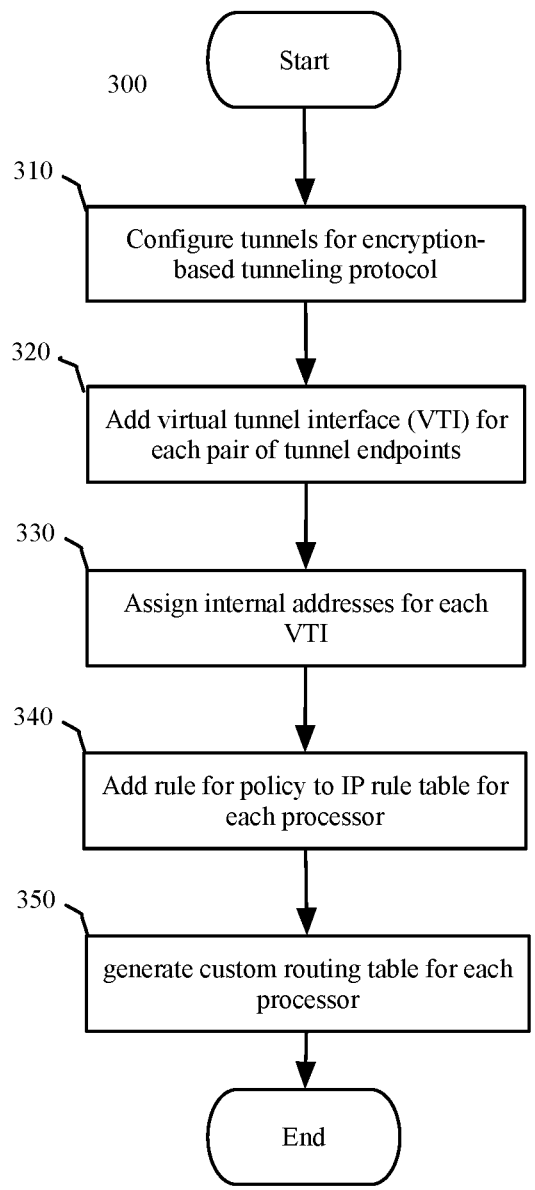
FIG. 3 conceptually illustrates a process for configuring processors of a gateway computer to use specific tunnels for transmitting data messages.

FIG. 3 conceptually illustrates a process 300 for configuring processors of a gateway computer to use specific tunnels for transmitting data messages. The process begins by configuring (at 310) tunnels for an encryption-based protocol (e.g., IPSec). The configuration for each tunnel includes, in some embodiments, specifying the network (e.g., IP) addresses of the tunnel endpoints (i.e., the local tunnel endpoint and the remote tunnel endpoint), a source subnet (e.g., a "rightsubnet"), a destination subnet (e.g., a "leftsubnet"), and an optional mark value that can be used to select a particular tunnel when two tunnels are configured with the same source subnet and destination subnet. As an example, a pair of tunnels can be defined as below:

```
conn tun1 left = 123.0.0.1           ← local tunnel end-point
right = 123.0.0.2          ← remote tunnel end-point
rightsubnet = 0.0.0.0/0    ← source subnet is Any
leftsubnet = 0.0.0.0/0     ← destination subnet is Any
mark = 1                   ← virtual tunnel interface key value
conn tun2 left = 123.0.0.1           ← local tunnel end-point
right = 124.0.0.2          ← remote tunnel end-point
rightsubnet = 0.0.0.0/0    ← source subnet is Any
leftsubnet = 0.0.0.0/0     ← destination subnet is Any
mark = 2                   ← virtual tunnel interface key value
```

Such that a data message marked with a virtual tunnel interface (VTI) key value of 1 is encrypted and sent over the first tunnel ("tun1"), and a data message marked with a VTI key value of 2 is encrypted and sent over the second tunnel ("tun2").

In order to mark the data messages, the process adds (at 320) a virtual tunnel interface (VTI) key corresponding to each pair of tunnel endpoints. The VTI in some embodiments acts as a packet destination device that serves to mark a data message with the key value of the VTI device. As discussed above, the VTI and its associated key value (e.g., mark) are used to distinguish data messages requiring encryption using a particular tunnel from data messages either requiring encryption using a different tunnel or not requiring encryption at all.

Once the VTI key is added for each pair of tunnel endpoints, an internal network (e.g., IP) address is assigned (at 330). The assigned VTI is for internal use and does not consume public IP addresses allocated to a user, nor does a destination need to be aware of the assigned network address. Accordingly, in setting up the private network address for the VTI it is specified as a "NOARP" address so that the system will not respond to address resolution protocol requests for the assigned address.

The process then adds (at 340) a rule to an IP rule table that specifies a desired policy or multiple desired policies for data messages requiring encryption. In some embodiments, the policy is more specific than the policy specified in establishing tunnels. For example, a tunnel may specify an any-to-any policy as in the example using "tun1" and "tun2" above, but the rule added to the IP rule table specifies that it applies to data messages from 192.168.1.0/24 to 192.168.2.0/24. If multiple policies are desired, each policy is added as a separate entry in the IP rule table. In some embodiments, the IP rule table is a shared IP rule table, while in others each core maintains its own IP rule table. Even when each core maintains its own IP rule table, in some embodiments, the IP rule tables are populated with identical rules. The rule added to the IP rule table points to a routing table to use to route the packet that matches the IP rule.

To properly mark and route the data messages matching the added rule, the process generates (at 350) a custom routing table for each core. The custom routing table will have an entry for the destination subnet matching the rule added to the IP rule table. The entry for the destination subnet in some embodiments includes multiple network addresses associated with different VTIs. In some embodiments, the VTI used is based on a hash of packet attributes (e.g., header values such as a 5-tuple). Using a consistent hash of packet attributes ensures that data messages belonging to the same flow will be marked with the same VTI, and ultimately sent over the same tunnel using the same encryption parameters. In some embodiments, the VTI is selected based on a different selection algorithm (e.g., round robin, random or pseudo-random) and a table is maintained to record the matching between a particular data message flow and a particular VTI to ensure that data messages belonging to the same flow will be marked with the same VTI, and ultimately sent over the same tunnel using the same encryption parameters. Once the custom routing tables are generated on each core for each IP rule, the process ends.

Figure 4:
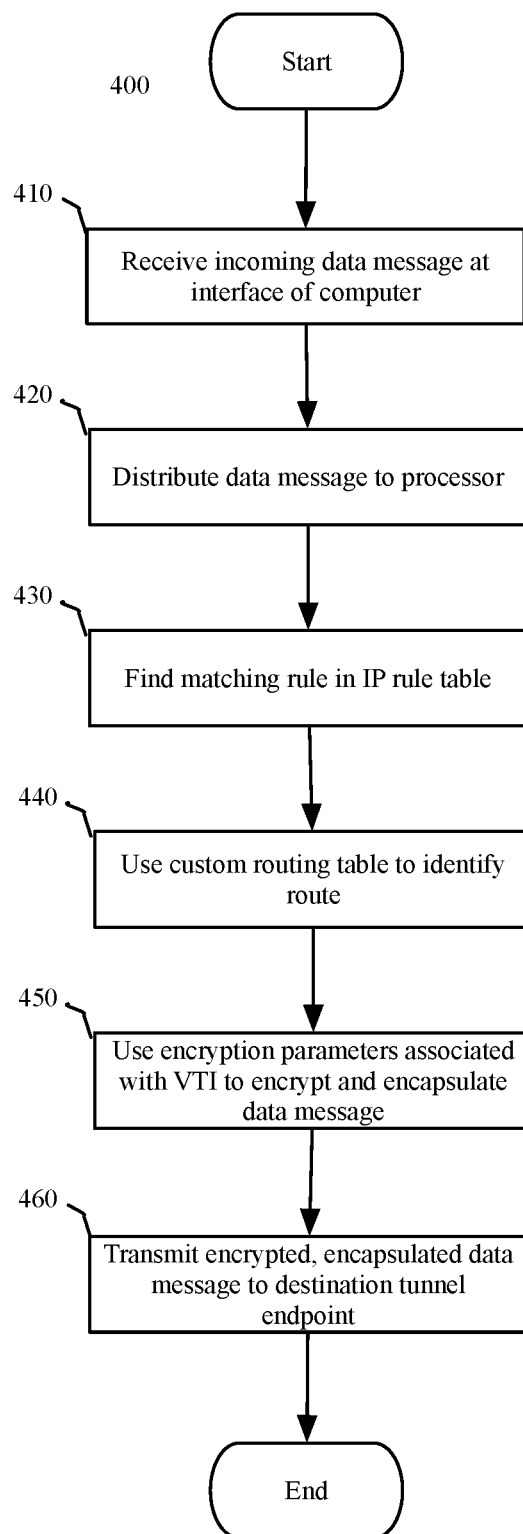
FIG. 4 conceptually illustrates a process for receiving a data message, distributing the data message to a particular core, encrypting the data message, and transmitting the encrypted data message to a destination tunnel endpoint.

FIG. 4 conceptually illustrates a process 400 for receiving a data message, distributing the data message to a particular core, encrypting the data message, and transmitting the encrypted data message to a destination tunnel endpoint. Process 400, in some embodiments, is performed by a gateway computer or a component of a gateway computer such as a hypervisor or other virtualization engine. Process 400 begins by receiving (at 410) an incoming plaintext data message for transmission towards a destination of the data message. In some embodiments, the data message is received at a physical NIC (pNIC) of a gateway computer or a computer executing the gateway computer.

After receiving the data message, the data message is distributed (at 420) to a processor (or core). As discussed above in relation to FIG. 1, a virtual NIC (vNIC) of the gateway computer in some embodiments receives the data message from a pNIC. The vNIC of a virtual gateway computer (or the pNIC of a physical gateway computer) may then queue the data message for the driver to either determine a core to use to process the queued data messages or to re-queue the data messages in particular queues that are associated with particular cores. The queueing or re-queueing, in some embodiments, is based on attributes of the data message. In some embodiments, a hash of data message attributes is used to determine the queue and/or core (processor) used to process the data message. In some embodiments, the hash is of attributes that define a data message flow (e.g., a 5-tuple). Using a consistent hash ensures that data messages belonging to a same data message flow are processed by a same core (or processor). In some embodiments, the distribution is a receive side scaling (RSS) operation, while in other embodiments it is a receive packet steering (RPS) or receive flow steering (RFS) operation.

After the data message is distributed to a core, the core begins processing the data message by finding (at 430) a matching IP rule in an IP rule table. For more details of the configuration of the IP rule table see FIG. 3 above. The matching IP rule points to a lookup table that the processor uses to find the nexthop for the data message. In some embodiments, the lookup table is a custom routing table that was previously generated to associate the IP rule with a VTI or set of VTIs for a particular processor.

The identified custom routing table is then used (at 440) to identify a route. Identifying a route, in some embodiments, includes identifying a route among multiple possible routes where each route is associated with a VTI (i.e., the network address associated with the VTI). In some embodiments, the identified route is selected based on a hash of data message attributes (e.g., a 5-tuple) that identifies a data message flow. In other embodiments, the identified route is selected based on a different selection algorithm (e.g., round robin, random or pseudo-random) and a table is maintained to record the matching between a particular data message flow and a particular route to ensure that data messages belonging to the same flow will use the same route and ultimately sent over the same tunnel using the same encryption parameters. As part of identifying a route, a mark (or key value) that is associated with the data message is identified.

The process then uses (at 450) a set of encryption parameters (e.g., a security association (SA) in IPSec) that match the data message and the mark associated with the VTI to encrypt the data message. Encryption parameters in some embodiments match a data message when a source network address and destination address match a policy specified for a particular encryption tunnel and also match a mark (e.g., key value) specified for the particular encryption tunnel. The encryption parameters in some embodiments include (1) a transform (e.g., authentication header (AH) or encapsulating security payload (ESP)), (2) an encryption algorithm (e.g., advanced encryption standard (AES), tripleDES (3DES) cipher block chaining (CBC), etc.), and (3) encryption key identification information.

Once the data message is encrypted, the process (at 460) transmits the encrypted data message over the tunnel specified by the encryption parameters identified. The encrypted data message, in some embodiments, includes an unencrypted portion specifying the remote tunnel endpoint and the encryption key identification (e.g., an SPI for IPSec). The unencrypted portion is used by the remote tunnel endpoint to decrypt the data message. In some embodiments, the unencrypted portion is also used to distribute the data message among the cores of the gateway computer that receives the encrypted data message as discussed below in relation to FIGS. 10 and 11.

Figure 5:
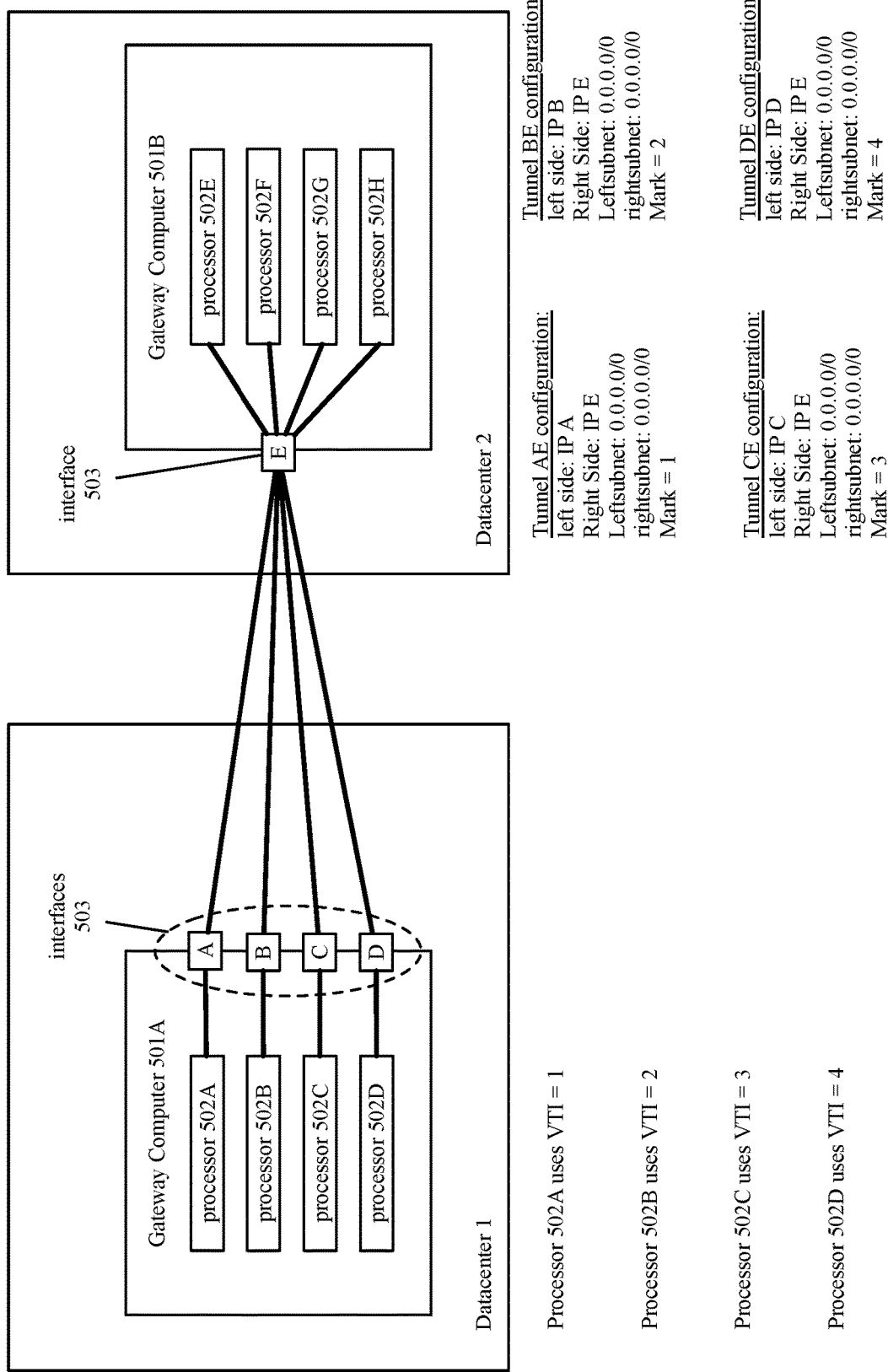
FIG. 5 illustrates a configurations of tunnel endpoints and tunnels for an encryption-based tunneling protocol.

FIGS. 5-8 illustrate different configurations of tunnel endpoints and tunnels for an encryption-based tunneling protocol. FIG. 5 illustrates a gateway computer 501A in a first datacenter that has four processors (or cores) 502A-D and four interfaces "A-D" (e.g., public network addresses) 503. FIG. 5 also illustrates a gateway computer 501B in a second datacenter that has four processors (or cores) 502E-H and a single interface "E" (e.g., public network addresses) 503. A full-mesh configuration of tunnels is established between the interfaces of the two gateway computers 501A-B (i.e., a tunnel between each interface (A-D) of gateway computer 501A and the interface of gateway computer 501B).

Each processor 502 of gateway computer 501A is configured to use a particular interface 503 (i.e., tunnel) by having the routing table for each processor configured to mark data messages with a particular VTI as described above in relation to FIG. 3. Each encryption tunnel in the depicted embodiment is configured to encrypt data messages from any source subnet (0.0.0.0/0) to any destination subnet (0.0.0.0/0) that are marked with a key value specific to that tunnel. Each encryption tunnel in this embodiment is specified at the system level using standard tunnel configuration software (e.g., strongSwan, Libreswan, Openswan, etc.), without needing to configure each processor with a particular encryption tunnel. Because each processor 502 is associated with a specific encryption tunnel that is not used by any other processor 502, two processors 502 do not attempt to encrypt data messages using the same encryption parameters and no conflicts need to be resolved for encrypting data messages according to encryption parameters that include sequencing information for encrypted data messages.

FIG. 5 also shows exemplary encryption tunnel configurations. As described above in relation to FIG. 3, each tunnel specifies (1) a "left side" tunnel endpoint, e.g., IP A, (2) a "right side" tunnel endpoint, IP E, (3) a "leftsubnet," 0.0.0.0/0, (4) a "rightsubnet," 0.0.0.0/0, and (5) a mark, or key value, that match data messages requiring encryption over the encryption tunnel. Although not shown, the tunnel configuration also includes other information identified above such as a transform to use (e.g., authentication header (AH) or encapsulating security payload (ESP)), an encryption algorithm (e.g., advanced encryption standard (AES), tripleDES (3DES) cipher block chaining (CBC), etc.), and encryption key identification information. The "leftsubnet" and "rightsubnet" represent an "encryption policy" that defines data message traffic that requires encryption and for each tunnel in FIG. 5 represents a same any-to-any encryption policy that encrypts all data messages that are marked with the particular mark or key value. In some embodiments, multiple policies are defined at the level of the IP rule table and data messages matching the policy as defined in the IP rule table for a particular processor 502 are encrypted using the same encryption tunnel.

Figure 6:
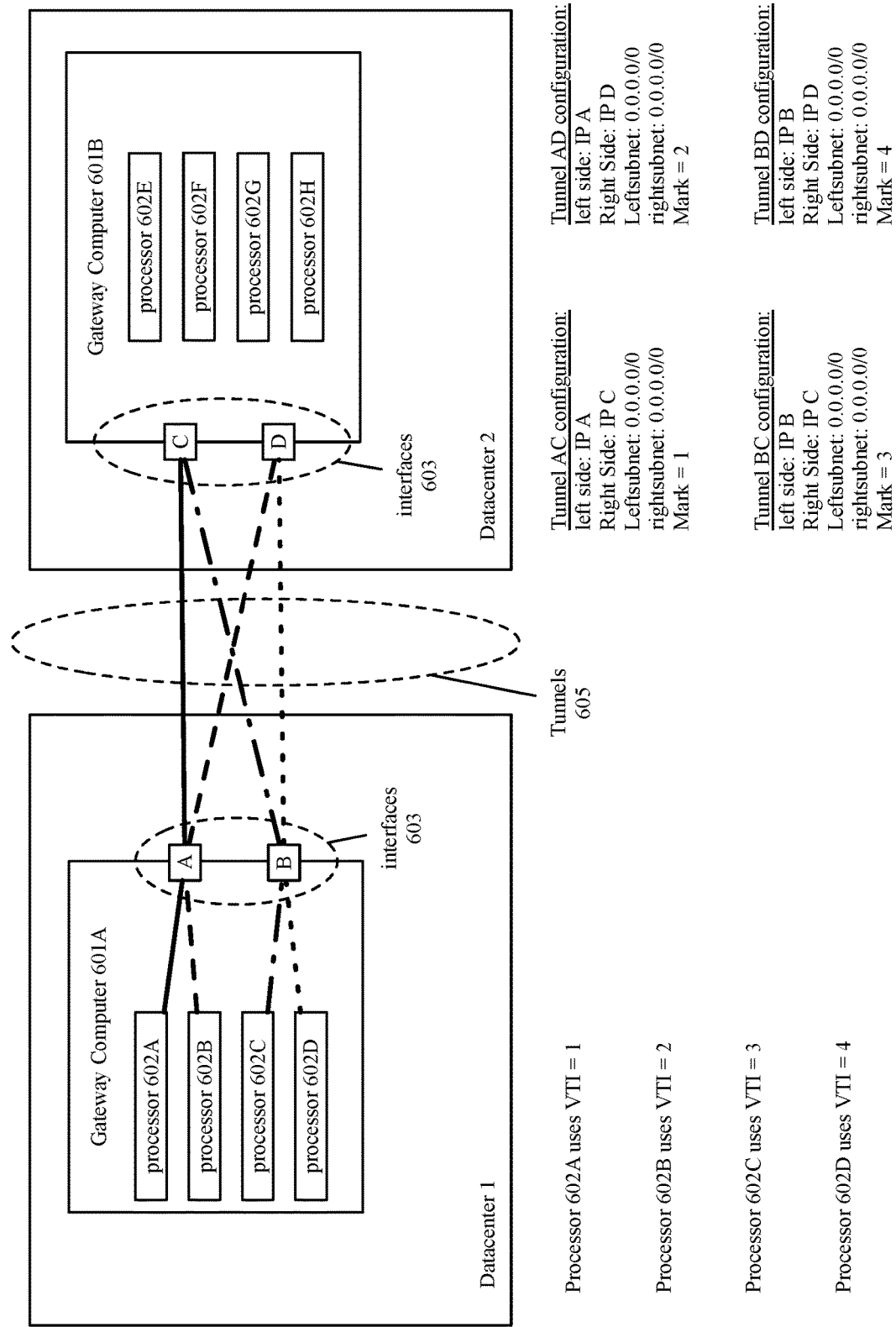
FIG. 6 conceptually illustrates a set of computers in a network configured with multiple interfaces configured with multiple tunnels using virtual tunnel interfaces.

FIG. 6 illustrates another embodiment in which each gateway computer has two interfaces. FIG. 6 illustrates a gateway computer 601A in a first datacenter that has four processors (or cores) 602A-D and two interfaces "A" and "B" (e.g., public network addresses) 603. FIG. 6 also illustrates a gateway computer 601B in a second datacenter that has four processors (or cores) 602E-H and two interfaces "C" and "D" (e.g., public network addresses) 603. A full-mesh configuration of tunnels is established between the interfaces of the two gateway computers 601A-B (i.e., a tunnel between each interface (A and B) of gateway computer 601A and each interface of gateway computer 601B (C and D) for a total of four tunnels).

Each processor 602 of gateway computer 601A is configured to use a particular tunnel (indicated by a different line style in FIG. 6) by having the routing table for each processor configured to mark data messages with a particular VTI as described above in relation to FIG. 3. Each encryption tunnel in the depicted embodiment is configured to encrypt data messages from any source subnet (0.0.0.0/0) to any destination subnet (0.0.0.0/0) that are marked with a key value specific to that tunnel. Each encryption tunnel in this embodiment is specified at the system level using standard tunnel configuration software (e.g., strongSwan, Libreswan, Openswan, etc.), without needing to configure each processor with a particular encryption tunnel. Because each processor 602 is associated with a specific encryption tunnel that is not used by any other processor 602, two processors 602 do not attempt to encrypt data messages using the same encryption parameters and no conflicts need to be resolved for encrypting data messages according to encryption parameters that include sequencing information for encrypted data messages.

FIG. 6 also shows exemplary encryption tunnel configurations. As described above in relation to FIG. 3, each tunnel specifies (1) a "left side" tunnel endpoint, e.g., IP A, (2) a "right side" tunnel endpoint, e.g., IP C, (3) a "leftsubnet," 0.0.0.0/0, (4) a "rightsubnet," 0.0.0.0/0, and (5) a mark, or key value, that match data messages requiring encryption over the encryption tunnel. Although not shown, the tunnel configuration also includes other information identified above such as a transform to use (e.g., authentication header (AH) or encapsulating security payload (ESP)), an encryption algorithm (e.g., advanced encryption standard (AES), tripleDES (3DES) cipher block chaining (CBC), etc.), and encryption key identification information. The "leftsubnet" and "rightsubnet" represent an "encryption policy" that defines data message traffic that requires encryption and for each tunnel in FIG. 6 represents a same any-to-any encryption policy that encrypts all data messages that are marked with the particular mark or key value. In some embodiments, multiple policies are defined at the level of the IP rule table and data messages matching the policy as defined in the IP rule table for a particular processor 602 are encrypted using the same encryption tunnel.

Figure 7:
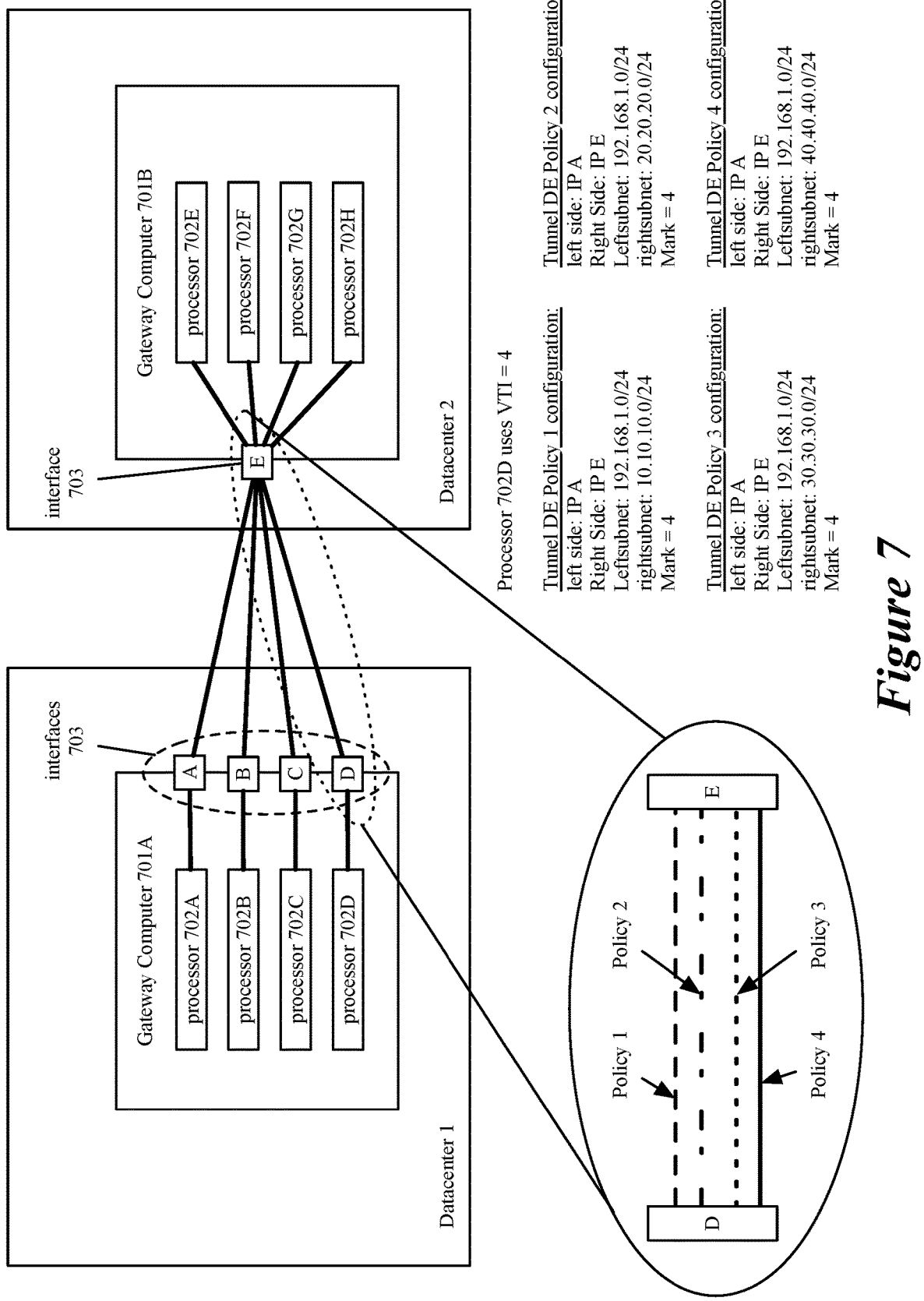
FIG. 7 conceptually illustrates a set of computers in a network configured with multiple tunnels using multiple encryption policies and virtual tunnel interfaces.

FIG. 7 illustrates an embodiment similar to that of FIG. 5, but using multiple encryption tunnels (e.g., policies) over each tunnel between two tunnel endpoints. FIG. 7 illustrates a gateway computer 701A in a first datacenter that has four processors (or cores) 702A-D and four interfaces "A-D" (e.g., public network addresses) 703. FIG. 7 also illustrates a gateway computer 701B in a second datacenter that has four processors (or cores) 702E-H and a single interface "E" (e.g., public network addresses) 703. A full-mesh configuration of tunnels is established between the interfaces of the two gateway computers 701A-B (i.e., a tunnel between each interface (A-D) of gateway computer 701A and the interface of gateway computer 701B).

Each processor 702 of gateway computer 701A is configured to use a particular interface 703 (i.e., tunnel) by having the routing table for each processor configured to mark data messages with a particular VTI as described above in relation to FIG. 3. Each tunnel in the depicted embodiment is configured with multiple encryption tunnels (only shown for tunnel between interface "D" and "E"). In the depicted embodiment, each encryption tunnel for a particular tunnel (or processor) is configured to encrypt data messages from a same source subnet (192.168.1.0/24) and marked with a same key value ("4"), but each policy is defined for a different destination subnet (e.g., 10.10.10.0/24, 20.20.20.0/24, etc.). Each encryption tunnel in this embodiment is specified at the system level using standard tunnel configuration software (e.g., strongSwan, Libreswan, Openswan, etc.), without needing to configure each processor with a particular encryption tunnel. Because each processor 702 is associated with a specific encryption tunnel that is not used by any other processor 702, two processors 702 do not attempt to encrypt data messages using the same encryption parameters and no conflicts need to be resolved for encrypting data messages according to encryption parameters that include sequencing information for encrypted data messages.

FIG. 7 represents another way to implement multiple policies in addition to using the IP rule table to specify policies. The embodiment of FIG. 7 is useful in at least the situation in which a user desires to encrypt traffic for different source and destination subnets using different types of encryption (e.g., using a different transform, algorithm, or encryption key). Another benefit of using multiple encryption tunnels over each tunnel is that each encryption tunnel is identified by a different identifier (e.g., security parameter index (SPI) for IPSec) and having more unique identifiers makes it likely that a receiving gateway computer will distribute received encrypted data messages among its processors more evenly when using a hash function or other function based on the identifier.

FIG. 7 also shows exemplary encryption tunnel configurations. As described above in relation to FIG. 3, each tunnel specifies (1) a "left side" tunnel endpoint, e.g., IP D, (2) a "right side" tunnel endpoint, IP E, (3) a "leftsubnet," 192.168.1.0/24, (4) a "rightsubnet," (e.g., 10.10.10.0/24, 20.20.20.0/24, etc.), and (5) a mark, or key value, that match data messages requiring encryption over the encryption tunnel. Although not shown, the tunnel configuration also includes other information identified above such as a transform to use (e.g., authentication header (AH) or encapsulating security payload (ESP)), an encryption algorithm (e.g., advanced encryption standard (AES), tripleDES (3DES) cipher block chaining (CBC), etc.), and encryption key identification information. The "leftsubnet" and "rightsubnet" represent an "encryption policy" that defines data message traffic that requires encryption and, as opposed to the embodiment depicted in FIG. 5, each tunnel in FIG. 7 represents a different encryption policy that applies to data messages from a same source subnet but to different destination subnets that are marked with the particular mark or key value.

Figure 8:
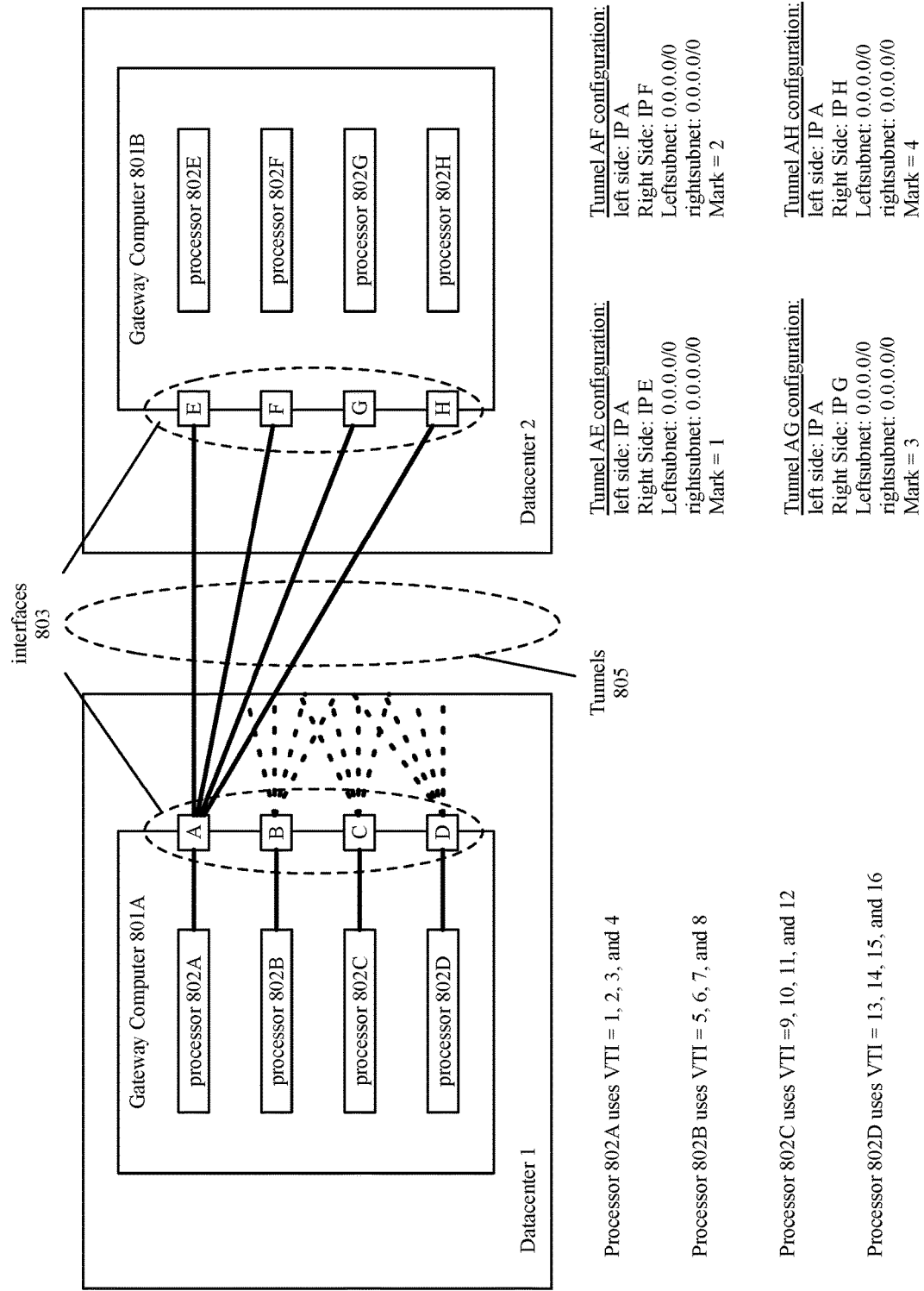
FIG. 8 conceptually illustrates a set of computers in a network configured with multiple tunnels using multiple encryption policies per processor.

FIG. 8 illustrates another embodiment in which each gateway computer has four interfaces. FIG. 8 illustrates a gateway computer 801A in a first datacenter that has four processors (or cores) 802A-D and four interfaces "A-D" (e.g., public network addresses) 803. FIG. 8 also illustrates a gateway computer 801B in a second datacenter that has four processors (or cores) 802E-H and four interfaces "E-H" (e.g., public network addresses) 803. A full-mesh configuration of tunnels is established between the interfaces of the two gateway computers 801A-B (i.e., a tunnel between each interface (A-D) of gateway computer 801A and each interface of gateway computer 801B (E-H) for a total of 16 tunnels). Tunnels between interface A and each of interfaces E-H are shown in solid lines, while tunnels originating at interfaces B-D are indicated by dashed lines that are truncated for clarity, but not because of any functional differences between the different sets of tunnels.

The functionality of the embodiment depicted in FIG. 8 is similar to that of the embodiments described above, but because of the greater number of tunnels each processor 802 and interface 803 is associated with multiple VTIs. Each processor 802 of gateway computer 801A is configured to use a particular tunnel by having the routing table for each processor configured to mark data messages with a particular set of VTIs as described above in relation to FIG. 3. Each encryption tunnel in the depicted embodiment is configured to encrypt data messages from any source subnet (0.0.0.0/0) to any destination subnet (0.0.0.0/0) that are marked with a key value specific to that tunnel. Each encryption tunnel in this embodiment is specified at the system level using standard tunnel configuration software (e.g., strongSwan, Libreswan, Openswan, etc.), without needing to configure each processor with a particular encryption tunnel. Because each processor 802 is associated with a specific set of encryption tunnels that is not used by any other processor 802, two processors 802 do not attempt to encrypt data messages using the same encryption parameters and no conflicts need to be resolved for encrypting data messages according to encryption parameters that include sequencing information for encrypted data messages.

FIG. 8 also shows exemplary encryption tunnel configurations. As described above in relation to FIG. 3, each tunnel specifies (1) a "left side" tunnel endpoint, e.g., IP A, (2) a "right side" tunnel endpoint, e.g., IP E, (3) a "leftsubnet," 0.0.0.0/0, (4) a "rightsubnet," 0.0.0.0/0, and (5) a mark, or key value, that match data messages requiring encryption over the encryption tunnel. Although not shown, the tunnel configuration also includes other information identified above such as a transform to use (e.g., authentication header (AH) or encapsulating security payload (ESP)), an encryption algorithm (e.g., advanced encryption standard (AES), tripleDES (3DES) cipher block chaining (CBC), etc.), and encryption key identification information.

The "leftsubnet" and "rightsubnet" represent an "encryption policy" that defines data message traffic that requires encryption, and for each tunnel in FIG. 8, represents a same any-to-any encryption policy that encrypts all data messages that are marked with the particular mark or key value. The choice of key value among the set of key values associated with a particular processor is as described above in relation to FIG. 3 and is made such that all data messages in a particular data message flow are marked with a same key value and sent over the same encryption tunnel. In some embodiments, multiple policies are defined at the level of the IP rule table and data messages matching the policy as defined in the IP rule table for a particular processor 802 are encrypted using the same encryption tunnel.

As for the embodiment described in relation to FIG. 7, a benefit of using multiple tunnels is that each encryption tunnel for the multiple tunnels is identified by a different identifier (e.g., security parameter index (SPI) for IPSec) and having more unique identifiers makes it likely that a receiving gateway computer will distribute received encrypted data messages among its processors more evenly when using a hash function or other function based on the identifier. In some embodiments, each of the 16 tunnels of FIG. 8 comprises multiple encryption tunnels as in FIG. 7 in order to (1) implement desired encryption behavior for different encryption policies and/or (2) artificially increase the number of unique encryption tunnel identifiers (SPIs for IPSec). Increasing the number of encryption tunnels (and unique encryption tunnel identifiers) by having multiple encryption tunnels for each tunnel further increases the likelihood of even distribution of data messages among the processors of a receiving gateway computer.

Figure 9:
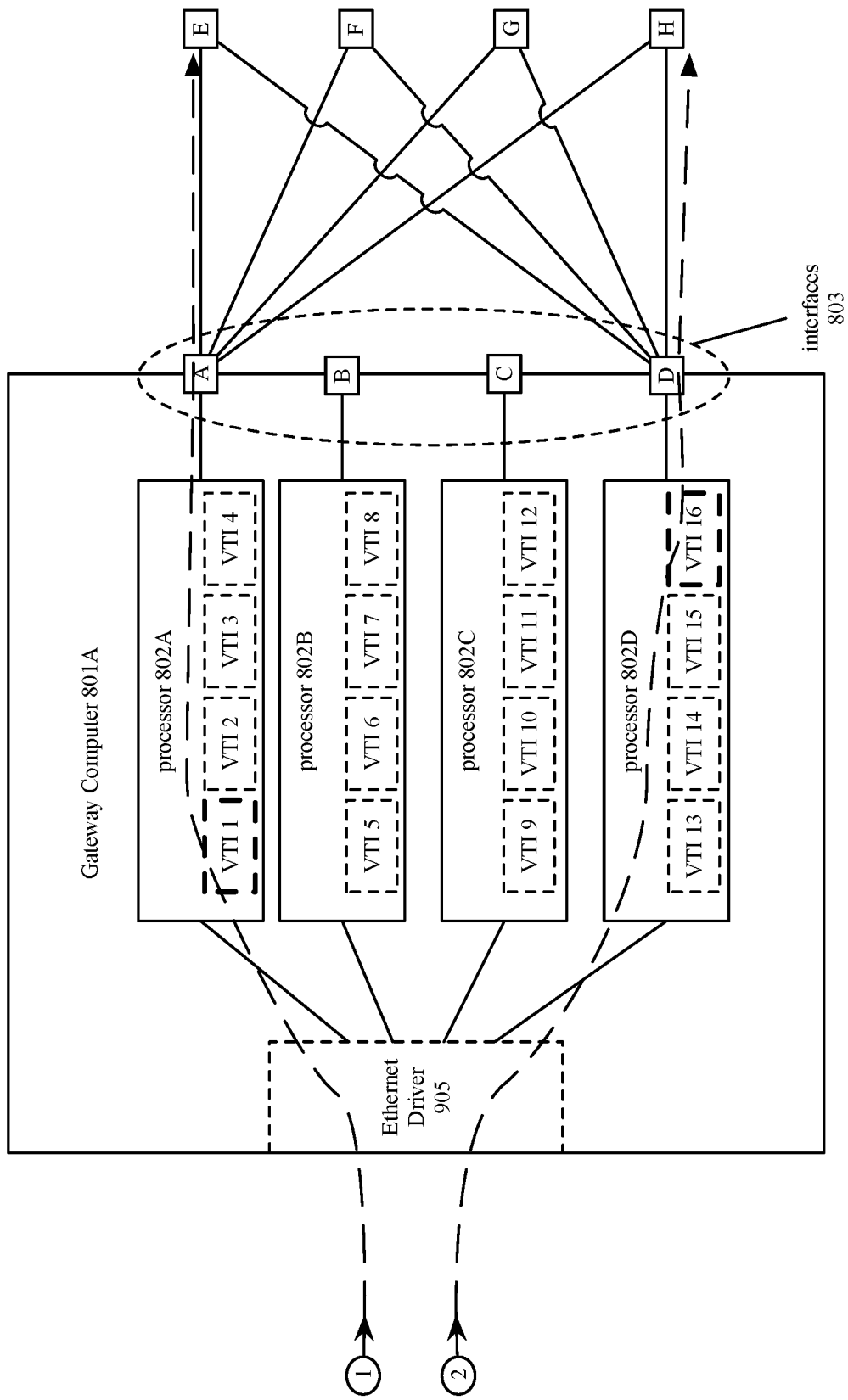
FIG. 9 conceptually illustrates a computer implementing multiple tunnels at each interface and applying multiple sets of encryption parameters at each processor.

FIG. 9 provides further details of gateway computer 801A and conceptually illustrates a computer implementing multiple tunnels at each interface and applying multiple sets of encryption parameters at each processor. In some embodiments, each set of encryption parameters specifies a same encryption policy but a different key value. Gateway computer 801A is shown in FIG. 9 with Ethernet driver 905, processors 802A-D, corresponding interfaces 803 (A-D), and the subset of the tunnels in the full-mesh tunnel configuration that connect interfaces A and D with interfaces E-H of gateway computer 801B (not shown) (tunnels connecting interfaces B and C to each of interfaces E-H omitted for clarity).

FIG. 9 also depicts each processor 802 associated with a set of VTIs. As described in relation to FIG. 8, each VTI is used as a key value for a particular tunnel. For a first data message in a particular data message flow, a particular processor selects a VTI to use to mark the particular data message and subsequent data messages in the data message flow as described in relation to FIG. 4. As discussed above in relation to FIG. 4, the mark applied based on the VTI, in some embodiments, is used along with the data message attributes to identify an encryption tunnel over which an encrypted data message is sent. In some embodiments, a set of encryption parameters is a security association (SA) for an IPSec tunnel with a unique security parameter index (SPI) used to identify the encryption tunnel at the receiving gateway computer.

Ethernet driver 905 represents an interface capable of pre-processing data messages (e.g., distributing data messages among the processors 802), at which data messages are received. As described above in relation to FIG. 4, Ethernet driver 905 receives data messages to be forwarded by the gateway computer 801A and distributes the data messages among the processors (e.g., using queues associated with particular processors).

Processors 802 are used to process data messages received from Ethernet driver 905. Each processor 802 of gateway computer 801A is shown as using four unique VTIs corresponding to four encryption tunnels (e.g., SAs). These encryption tunnels are defined for communication with interfaces of gateway computer 801B, and additional encryption tunnels are defined for communication with additional gateway computers. Each of the four unique encryption tunnels has an encryption policy that identifies a same set of data message traffic (e.g., traffic between particular subnets using particular ports) as requiring encryption, but specifies a different tunnel through which the encrypted data message traffic is transmitted. Tunnels from each of interfaces B and C to each of the interfaces E-H are omitted for clarity but will be understood, by one of ordinary skill in the art, to be present as part of a full-mesh connection between the gateway computers 801A and 801B. The use of multiple tunnels allows multiple encryption parameter sets identified by locally-unique identifiers (e.g., SPIs), using a same encryption policy, to be applied at a single processor when using an encryption-based tunneling protocol such as IPSec that does not allow identical encryption policies to be applied to traffic over a same tunnel.

Additionally, by using the different encryption tunnels to encrypt different data message flows, data message flows are more likely to be distributed among the different tunnels more equally. Further increasing the number of interfaces (and tunnels) can improve the probability of a more even distribution. In some embodiments, a set of attributes of the original data message (e.g., header values of the unencrypted data message) is used to determine a processor to process the data message and the VTI used by the processor for particular data message flows. In some embodiments, the determination is based on a hash function on attributes of the original data message. The hash functions for determining a processor, in some embodiments, is a different hash function than the hash function used to determine the VTI. In some embodiments, the attributes are header values (e.g., any combination of a source IP address, destination IP address, source port, destination port, and protocol type) that define a data message flow. Using a hash function based on attributes that define a data message flow ensures that data messages belonging to a same data message flow are processed by a same processor and VTI, and are sent out using a same encryption tunnel with a particular locally-unique identifier (e.g., an SPI).

It is understood by one of ordinary skill in the art that a set of encryption tunnels may be generated for each other gateway computer to which a particular gateway computer establishes tunnels.

FIG. 9 further provides an example of data message processing. FIG. 9 depicts a first data message (marked with a 1) that is received at Ethernet driver 905 and is distributed to processor 802A, while a second data message marked with a 2 is distributed to processor 802D. This distribution in some embodiments is performed based on a set of attributes of the different data messages as described above in relation to selecting an encryption parameter set and in relation to FIG. 4 above. The processors that receive the first and second data messages select a particular VTI that is used to mark the data message, then encrypt and encapsulate the data message as described above. In FIG. 9, the first data message is marked using VTI 1 which specifies a first tunnel between interface A of gateway computer 801A and interface E of gateway computer 801B (801B not shown). The second data message is processed using VTI 16 which specifies a second tunnel between interface D of gateway computer 801A and interface H of gateway computer 801B (801B not shown). As described above, each VTI in FIG. 9 corresponds to a particular one of the tunnels in the full-mesh tunnel configuration between the four interfaces on gateway computer 801A and the four interfaces of gateway computer 801B. It is understood that increasing the number of interfaces allows additional tunnels and corresponding VTIs and encryption tunnels (e.g., SAs) to be used.

Figure 10:
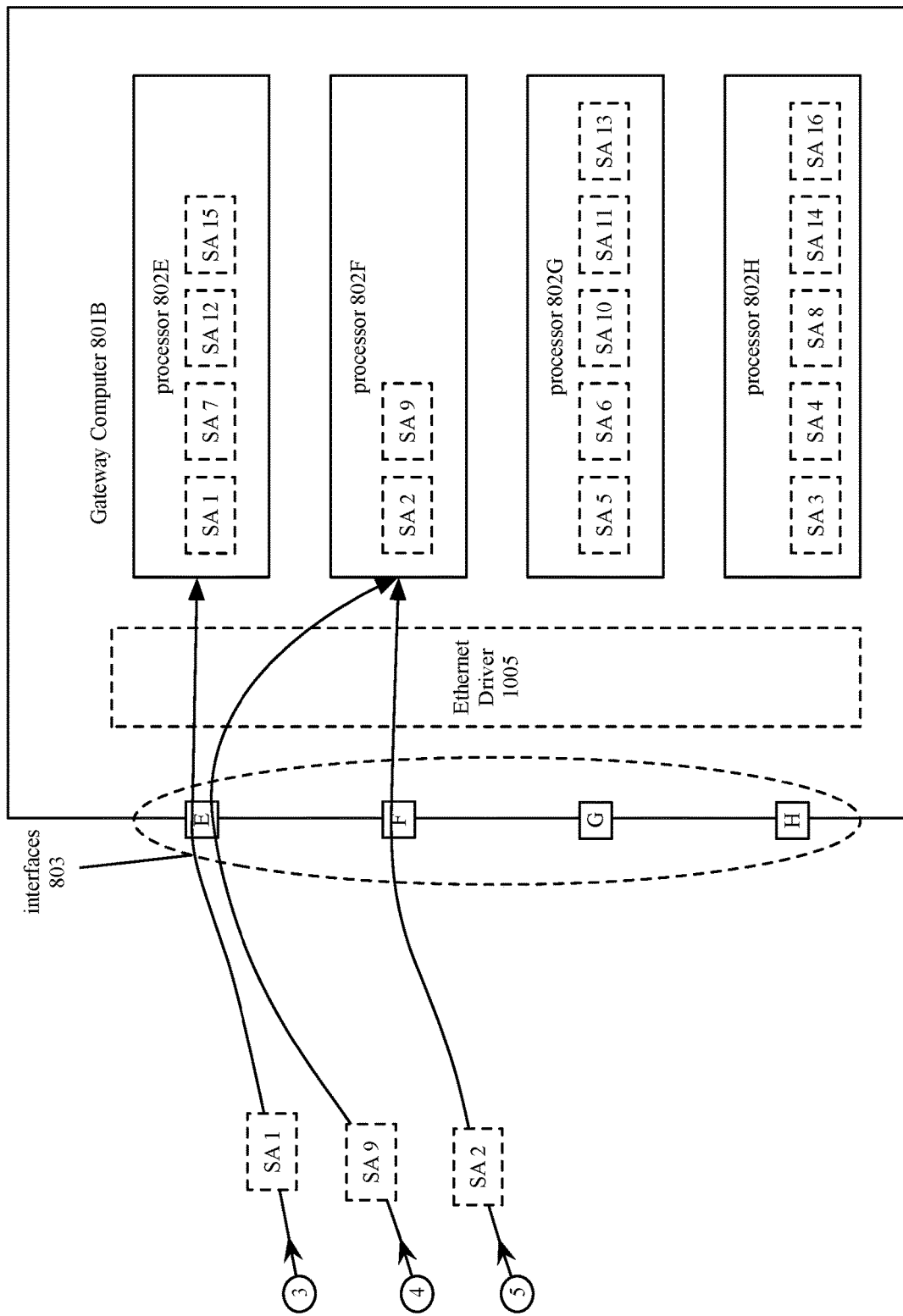
FIG. 10 conceptually illustrates a computer receiving encrypted data messages over multiple tunnels and distributing data message processing among multiple processors.

FIG. 10 provides further details of gateway computer 801B and conceptually illustrates a computer receiving encrypted data messages over multiple tunnels and over multiple encryption tunnels and distributing data message processing among multiple processors. Gateway computer 801B is shown in FIG. 10 with Ethernet driver 1005, processors 802E-H, and interfaces E-H. FIG. 10 also depicts examples of encryption parameters sets, and security associations (SAs) 1-16, which are associated with VTIs 1-16 respectively, distributed to the four processors based on unencrypted header values of the received data messages.

Encrypted data messages 3-5 received by gateway computer 801B include unencrypted header values that are used to distribute encrypted data messages among processors of the destination computer. In some embodiments, the unencrypted header values include the network address of the interface and a locally-unique identifier for a set of encryption parameters (e.g., a security parameter index (SPI) for an SA). In some embodiments, a hash of a set of unencrypted header values (e.g., the unencrypted locally-unique identifier and/or tunnel endpoint network address) can be used to distribute encrypted data messages among the processors of the destination computer. As shown in FIG. 10, based on the unencrypted header values, data message 3 is encrypted according to SA1 and is distributed to processor 802E, and data messages 4 and 5 are encrypted according to SA9 and SA2 respectively and are distributed to processor 802F. Additionally, FIG. 10 shows an exemplary distribution of data messages encrypted using the other SAs used by gateway computer 801A among the processors of gateway computer 801B as they are received.

In this embodiment, there are 16 different network address/encryption-parameter-set identifier pairs that may be hashed to distribute data messages among the four processors of gateway computer 801B, while still processing each data message flow at a single processor. This is in contrast to a system in which a single tunnel connects two gateway computers and all traffic is processed by a single processor of the receiving gateway computer (e.g., based on a hash of a single IP address/SPI pair) or is processed by multiple processors (e.g., based on a distribution that does not assign data messages of the same flow to the same processor), which must then integrate randomly distributed data messages into the correct data message flows.

Additionally, by increasing the number of interfaces and the number of tunnels between two computers, a larger number of sets of encryption parameters can be defined that uses a same policy for determining that a data message requires encryption on each of the tunnels. Because each set of encryption parameters will be associated with a different locally-unique identifier that is included in the unencrypted header values, the probability that the data message load is spread more equally among the processors of the destination device is increased. For example, distributing a set of four SAs results in a distribution wherein a given processor receives no traffic approximately 30 percent of the time where distributing a set of 16 SAs results in a distribution wherein a given processor receives no traffic approximately 1 percent of the time. If the distribution among tunnels and SAs on the transmit side is based on data message attributes that define a data message flow, then each data message in a data message flow will be processed by a same processor and SA on the transmit side as well as a same processor on the receive side.

Figure 11:
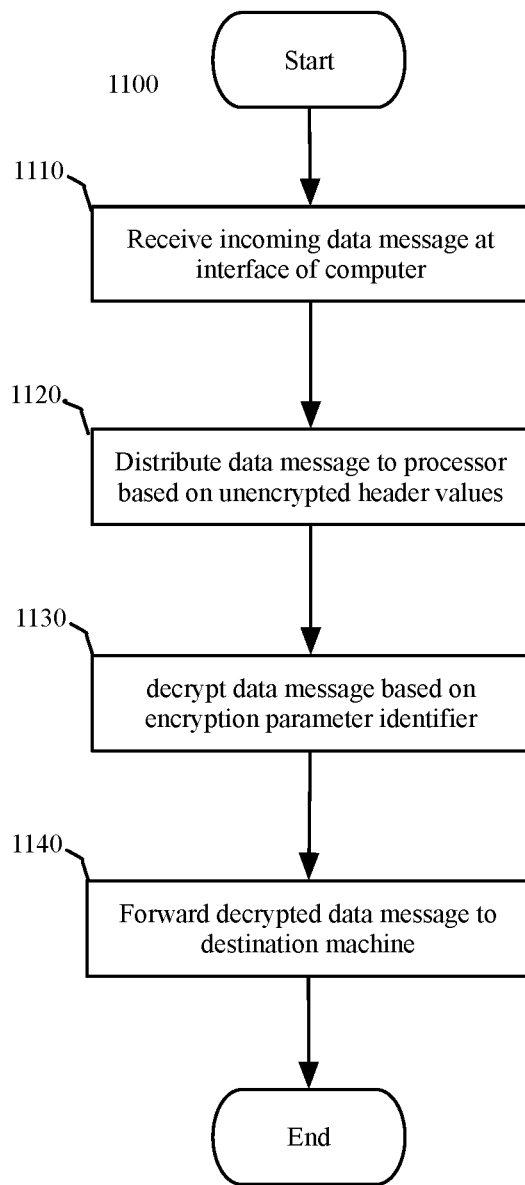
FIG. 11 conceptually illustrates a process for receiving data messages, distributing data messages among a set of processors, decrypting data messages, and forwarding decrypted data messages to a destination machine.

FIG. 11 conceptually illustrates a process 1100 for receiving data messages, distributing data messages among a set of processors, decrypting data messages, and forwarding decrypted data messages to a destination machine. In some embodiments process 1100 is performed by a gateway computer (i.e., by different hardware or software components of the gateway computer). Process 1100 begins (at 1110) by receiving, at an interface belonging to the computer which performs the steps of the process, an incoming data message for forwarding to a destination machine. The received data message in some embodiments includes an unencrypted (cleartext) portion and an encrypted (ciphertext) portion. In some embodiments, the unencrypted portion includes a network address of the interface, at which the data message is received, and an encryption-parameter-set identifier (e.g., an SPI) in header fields.

The process then distributes (at 1120) the received data message to one of the processors based on the unencrypted header values. The distribution is based on at least the encryption-parameter-set identifier. In some embodiments, an encryption-parameter-set identifier is mapped to a particular processor of the gateway computer that receives an encrypted data message. In some embodiments, the distribution (or mapping) is based on a hash of the encryption-parameter-set identifier or the encryption-parameter-set identifier and the network address. In some embodiments, the distribution is a receive side scaling (RSS), while in other embodiments it is a receive packet steering (RPS) or receive flow steering (RFS) operation.

By hashing the encryption-parameter-set identifier, the distribution is more likely to be more evenly distributed among the processors than hashing based only on a network address. This is especially true in a case where a single interface receives traffic over multiple tunnels, as the encryption-parameter-set identifiers are by definition locally-unique and data messages using different encryption-parameter-set identifiers can be distributed to different processors based on a hash of the different identifiers, but if there is only one network address only one processor can be identified based on a hash of the network address.

Hashing the encryption-parameter-set identifier also ensures that each flow is processed by a same processor in the receiving gateway computer because the encryption parameter set used for a particular data message and data message flow is selected based on attributes that define the data message flow. Ensuring that a same processor processes each data message in a data message flow removes any locking issues that arise when different processors process data messages in a data message flow.

Because encryption-parameter-set identifiers are not determined by the specifics of an encryption tunnel (e.g., SPIs in IPSec are arbitrarily assigned), in some embodiments, to ensure more even distribution among the processors of the gateway computer that receives data messages specific encryption-parameter-set identifiers are chosen during the negotiation of the encryption tunnels. In some embodiments, a pool of encryption-parameter-set identifiers are generated for each processor such that encryption-parameter-set identifier in the pool hash to the particular processor. In some embodiments, an encryption-parameter-set identifier is generated such that it hashes to a specific processor at the time of encryption tunnel negotiation. Instead of hashing an encryption-parameter-set identifier to identify a processor, some embodiments encode a processor identity in an encryption-parameter-set identifier using a specified set of bits. In some embodiments in which an encryption-parameter-set identifier is chosen based on its relation to a particular processor, the encryption-parameter-set identifier for a particular encryption tunnel is chosen based on a load-balancing algorithm or method. In some embodiments, each new encryption tunnel is assigned an encryption-parameter-set identifier based on a current load of each processor. In some embodiments, encryption-parameter-set identifiers are selected in a round robin, random, or pseudo-random manner.

Once the data message is distributed to the processor, the process decrypts (at 1130) the data message using decryption parameters identified using the encryption-parameter-set identifier. After decrypting the data message, the process (at 1140) forwards the decrypted data message to the destination machine and the process ends.

Figure 12:
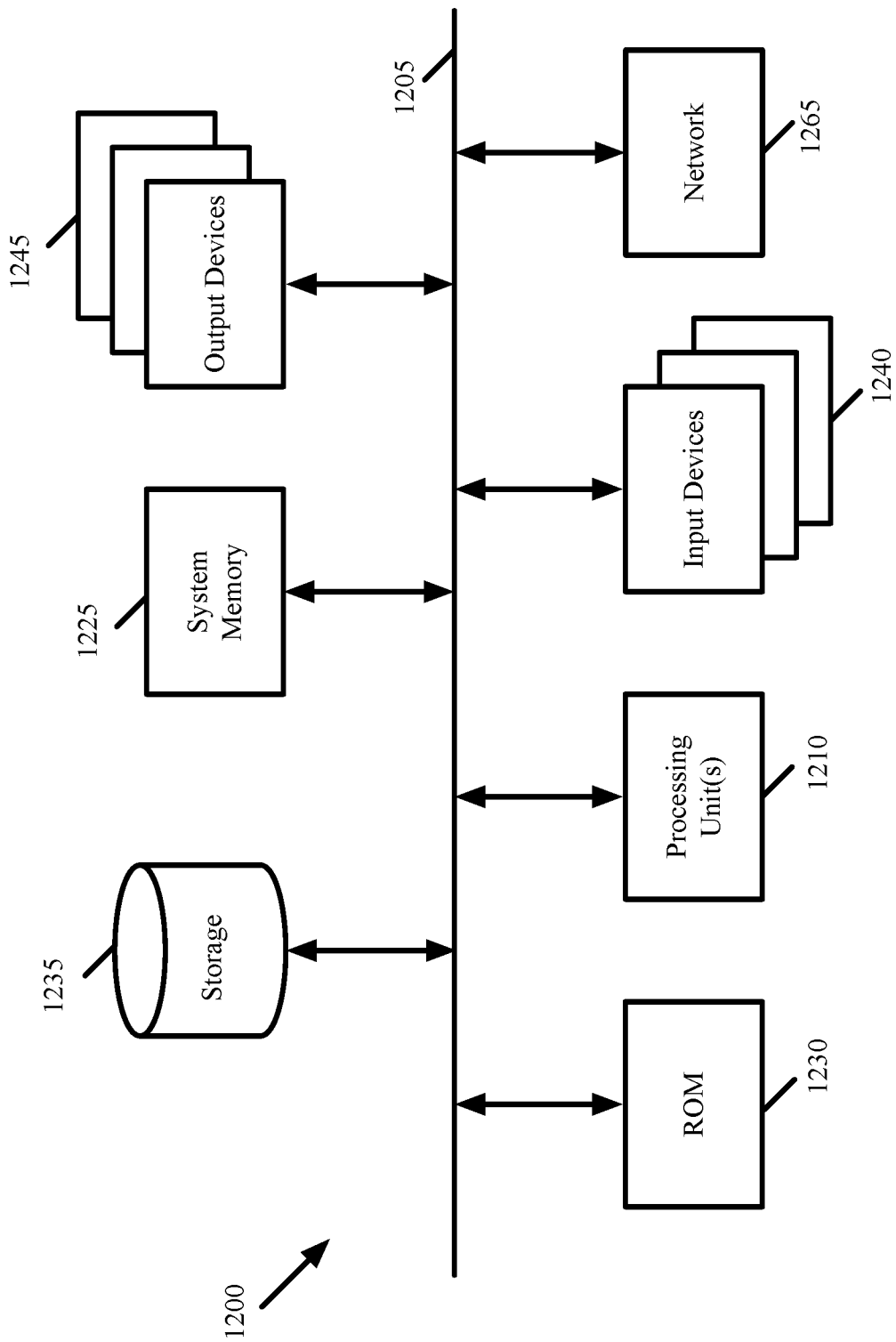
FIG. 12 conceptually illustrates an electronic system with which some embodiments of the invention are implemented.

FIG. 12 conceptually illustrates an electronic system 1200 with which some embodiments of the invention are implemented. The electronic system 1200 can be used to execute any of the control, virtualization, or operating system applications described above. The electronic system 1200 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1200 includes a bus 1205, processing unit(s) 1210, a system memory 1225, a read-only memory (ROM) 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the system memory 1225, and the permanent storage device 1235.

From these various memory units, the processing unit(s) 1210 retrieve instructions to execute and data to process in order to execute the processes of the invention. The processing unit(s) may be a single processor or a multi-core processor in different embodiments.

The read-only-memory 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device. Like the permanent storage device 1235, the system memory 1225 is a read-and-write memory device. However, unlike storage device 1235, the system memory is a volatile read-and-write memory, such as random access memory. The system memory stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieve instructions to execute and data to process in order to execute the processes of some embodiments.

The bus 1205 also connects to the input and output devices 1240 and 1245. The input devices enable the user to communicate information and select commands to the electronic system. The input devices 1240 include alphanumeric keyboards and pointing devices (also called "cursor control devices"). The output devices 1245 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 12, bus 1205 also couples electronic system 1200 to a network 1265 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host machine using resources of the host machine virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 3, 4, and 11) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for processing a plurality of encrypted data messages sent over a plurality of encryption-secured tunnels using a plurality of data message processing units of a first computer in a first datacenter, each encryption-secured tunnel identified by a unique security parameter index (SPI), the method comprising:

at the first computer:
receiving the plurality of encrypted data messages through the plurality of encryption-secured tunnels established between the first computer and a second computer;
using an SPI of a particular encrypted data message to select a processing unit in the plurality of processing units to process the particular encrypted data message; and
using the selected processing unit to process the particular encrypted data message;
wherein the plurality of encryption-secured tunnels is a first plurality, a particular security policy is implemented by a second plurality of encryption-secured tunnels in the first plurality of encryption-secured tunnels, each of the second plurality of encryption-secured tunnels established between a different pair of interfaces of the first and second computers, a third plurality of encryption-secured tunnels in the first plurality of encryption-secured tunnels implement a plurality of security policies, each encryption-secured tunnel in the third plurality of encryption-secured tunnels established between a first interface of the first computer and second interface of the second computer.

2. The method of claim 1, wherein the SPI is an unencrypted header value used to identify decryption parameters for decrypting the encrypted data message.

3. The method of claim 2, wherein using the SPI comprises hashing at least the unencrypted SPI of the particular encrypted data message to identify a particular processing unit to process the particular encrypted data message.

4. The method of claim 1, wherein the first computer comprises a plurality of interfaces, each interface serving as a tunnel endpoint for at least one encryption-secured tunnel.

5. The method of claim 1, wherein at least one interface in the plurality of interfaces serves as a tunnel endpoint for multiple encryption-secured tunnels between the first computer and the second computer.

6. The method of claim 1, wherein multiple encryption-secured tunnels in the plurality of encryption-secured tunnels are established between a first interface of the first computer and a second interface of the second computer.

7. The method of claim 1, wherein the encrypted data messages are encrypted using an internet protocol security (IPSec) protocol.

8. The method of claim 1, wherein
each encryption-secured tunnel implements a security policy identifying a source and destination of data messages requiring encryption.

9. A non-transitory machine readable medium storing a program for execution by a set of processing units, the program for processing a plurality of encrypted data messages sent over a plurality of encryption-secured tunnels using a plurality of data message processing units of a first computer in a first datacenter, each encryption-secured tunnel identified by a unique security parameter index (SPI), the program comprising sets of instructions for:

at the first computer, receiving the plurality of encrypted data messages through the plurality of encryption-secured tunnels established between the first computer and a second computer;
using an SPI of a particular encrypted data message to select a processing unit in the plurality of processing units to process the particular encrypted data message; and
using the selected processing unit to process the particular encrypted data message;

wherein the plurality of encryption-secured tunnels is a first plurality, a particular security policy is implemented by a second plurality of encryption-secured tunnels in the first plurality of encryption-secured tunnels, each of the second plurality of encryption-secured tunnels established between a different pair of interfaces of the first and second computers, a third plurality of encryption-secured tunnels in the first plurality of encryption-secured tunnels implement a plurality of security policies, each encryption-secured tunnel in the third plurality of encryption-secured tunnels established between a first interface of the first computer and second interface of the second computer.

10. The non-transitory machine readable medium of claim 9, wherein the SPI is an unencrypted header value used to identify decryption parameters for decrypting the encrypted data message.

11. The non-transitory machine readable medium of claim 10, wherein the set of instructions for using the SPI comprises a set of instructions for hashing at least the unencrypted SPI of the particular encrypted data message to identify a particular processing unit to process the particular encrypted data message.

12. The non-transitory machine readable medium of claim 9, wherein the first computer comprises a plurality of interfaces, each interface serving as a tunnel endpoint for at least one encryption-secured tunnel.

13. The non-transitory machine readable medium of claim 9, wherein at least one interface in the plurality of interfaces serves as a tunnel endpoint for multiple encryption-secured tunnels between the first computer and the second computer.

14. The non-transitory machine readable medium of claim 9, wherein multiple encryption-secured tunnels in the plurality of encryption-secured tunnels are established between a first interface of the first computer and a second interface of the second computer.

15. The non-transitory machine readable medium of claim 9, wherein the encrypted data messages are encrypted using an internet protocol security (IPSec) protocol.

16. The non-transitory machine readable medium of claim 9, wherein
each encryption-secured tunnel implements a security policy identifying a source and destination of data messages requiring encryption.

* * * * *